(12) United States Patent
Lachenmann et al.

(10) Patent No.: US 10,503,343 B2
(45) Date of Patent: Dec. 10, 2019

(54) INTEGRATED GRAPHICAL USER INTERFACE

(75) Inventors: Andreas Juergen Lachenmann, Aachen (DE); Matthias Günter Neugebauer, Aachen (DE); Wolfgang Manousek, Dormagen (DE); Mark A. Hillebrand, Aachen (DE); Holger Christoph Kenn, Aachen (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 497 days.

(21) Appl. No.: 13/176,750

(22) Filed: Jul. 6, 2011

(65) Prior Publication Data
US 2013/0014039 A1 Jan. 10, 2013

(51) Int. Cl.
*G06F 3/048* (2013.01)
*G06F 3/0481* (2013.01)
*G06F 8/38* (2018.01)

(52) U.S. Cl.
CPC .............. *G06F 3/0481* (2013.01); *G06F 8/38* (2013.01); *G06F 2203/04803* (2013.01)

(58) Field of Classification Search
CPC ...... G06F 3/00; G06F 3/04842; G06F 3/0488; G06F 3/167; G06F 3/1454; G06F 9/451; G06F 1/1694; G06F 2200/1637; G06F 3/012; G06F 3/0346; G06F 3/048; G06F 3/04815; G06F 3/04817; G06F 3/0482; G06F 3/0484; G06F 3/04845; G06F 3/04883; G06F 1/1613; G06F 1/1616; G06F 1/1626; G06F 1/1637; G06F 1/169; G06F 1/1692; G06F 2203/04105; G06F 2203/04106; G06F 2203/04108; G06F 2203/04806; G06F 3/0227; G06F 3/0304; G06F 3/033; G06F 3/0338; G06F 3/03547; G06F 3/03548; G06F 3/0362; G06F 3/041; G06F 3/0414; G06F 3/042; G06F 3/044; G06F 3/045; G06F 3/04812; G06F 13/00; G06F 16/86; G06F 17/00; G06F 17/18;
(Continued)

(56) References Cited

U.S. PATENT DOCUMENTS 4,247,843 A * 1/1981 Miller et al. .................. 340/973
4,802,104 A * 1/1989 Ogiso ........................... 715/209
(Continued)

OTHER PUBLICATIONS

Taieb,et al., "AD105 Domino OSGi unleashed: Everything you need to know and more", Retrieved at <<https://www-950.ibm.com/events/wwe/grp/grp006.nsf/vLookupPDFs/73604608/$file/73604608.pdf>>, Feb. 2011, pp. 1-20.
(Continued)

*Primary Examiner* — Di Xiao
(74) *Attorney, Agent, or Firm* — Medley, Behrens & Lewis, LLC

(57) ABSTRACT

A system described herein includes a receiver component that receives a first graphical user interface of a first computer-executable application and a second graphical user interface of a second computer-executable application. The system also includes an integration component that automatically causes a portion of the first graphical user interface and a portion of the second graphical user interface to be simultaneously displayed on a display screen in an integrated graphical user interface that appears to an end user as being a single application.

20 Claims, 9 Drawing Sheets

(58) Field of Classification Search
CPC .... G06F 1/1688; G06F 21/57; G06F 3/03543;
G06F 3/046; G06F 3/1423; G06F 3/1431;
G06F 3/1438; G06F 3/1462; G06F 3/147;
G06F 3/165; G06F 9/4843
USPC ........................................ 715/765, 752, 763
See application file for complete search history.

(56) References Cited

U.S. PATENT DOCUMENTS

| | | | | |
|---|---|---|---|---|
| 5,220,675 | A * | 6/1993 | Padawer et al. ............... | 715/826 |
| 5,551,030 | A * | 8/1996 | Linden et al. | |
| 5,706,456 | A * | 1/1998 | Dupper ................ | G06F 9/4443 |
| | | | | 715/763 |
| 5,794,164 | A * | 8/1998 | Beckert ................... | B60R 11/02 |
| | | | | 455/3.06 |
| 6,279,008 | B1 * | 8/2001 | Tung Ng et al. | |
| 7,610,406 | B2 | 10/2009 | Wu | |
| 7,788,338 | B2 | 8/2010 | Savchenko et al. | |
| 7,975,236 | B1 * | 7/2011 | Grechishkin et al. ........ | 715/765 |
| 8,587,546 | B1 * | 11/2013 | El-Khoury ............ | G06F 3/1431 |
| | | | | 345/173 |
| 8,984,446 | B1 * | 3/2015 | Meketa ................ | G06F 9/4443 |
| | | | | 715/778 |
| 2004/0002944 | A1 * | 1/2004 | Hauser .................... | G06F 9/541 |
| 2006/0085790 | A1 * | 4/2006 | Hintermeister et al. ...... | 718/100 |
| 2006/0085799 | A1 * | 4/2006 | Hoerle .................... | G06F 9/541 |
| | | | | 719/328 |
| 2006/0236328 | A1 * | 10/2006 | DeWitt ......................... | 719/329 |
| 2007/0266176 | A1 * | 11/2007 | Wu ................................ | 709/242 |
| 2008/0184135 | A1 | 7/2008 | Washburn et al. | |
| 2010/0063670 | A1 * | 3/2010 | Brzezinski .......... | H04L 67/1095 |
| | | | | 701/31.4 |
| 2010/0299436 | A1 * | 11/2010 | Khalid .................. | G06F 1/1643 |
| | | | | 709/226 |
| 2011/0166748 | A1 * | 7/2011 | Schneider .............. | B60K 35/00 |
| | | | | 701/36 |
| 2011/0169755 | A1 * | 7/2011 | Murphy ................ | G06F 9/4443 |
| | | | | 345/173 |
| 2011/0199389 | A1 * | 8/2011 | Lu ........................... | G06F 3/017 |
| | | | | 345/619 |
| 2012/0054401 | A1 * | 3/2012 | Cheng ................... | G06F 1/1632 |
| | | | | 710/304 |
| 2013/0335320 | A1 * | 12/2013 | Mori ...................... | G06F 13/00 |
| | | | | 345/156 |

OTHER PUBLICATIONS

"WebSphere Notes", Retrieved at <<http://wpcertification.blogspot.com/2010_09_01_archive.html>>, Sep. 2010, pp. 1-38.
"Installing XPage Extension controls in a specific NSF", Retrieved at <<http://xmage.gbs.com/blog.nsf/archive?openview&type=Month&key=2010-9>>, Sep. 17, 2010, pp. 1-4.
"Introducing Microsoft RemoteFX USB Redirection: Part 1", Retrieved at <<http://blogs.msdn.com/b/rds/archive/2010/06/10/introducing-microsoft-remotefx-usb-redirection-part-1.aspx>>, Jun. 10, 2010, pp. 1-4.

* cited by examiner

INTEGRATED GRAPHICAL USER INTERFACE

BACKGROUND

Automobiles are currently being manufactured with displays that are configured to present, to the driver of the automobile, a variety of different types of information pertaining to at least one condition of the automobile. For example, the display can present a current velocity of the automobile, a current amount of fuel in a fuel tank of the automobile, an expected amount of time until an oil change is needed in the automobile, amongst other data. Furthermore, oftentimes the manufacturer of the automobile will include a navigation application in a computer system of the automobile such that a driver can request navigation directions (from a current location to a desired destination) by pressing a touch sensitive screen, through voice commands, or the like. Other applications that are typically included in the computing system of the automobile include media players that allow the driver to quickly review information pertaining to an artist or song to be displayed to the driver, controls that allow the driver to select certain music, etc.

Generally, these computing systems in automobiles are closed systems, wherein the owner of the automobile is unable to install different applications on such computing system or modify applications that are installed on the computing system. Causing the computing device to be a closed system is undertaken to ensure safety, as modification of, for instance, an application that presents velocity to the driver may result in the driver traveling at unintended speeds. In certain situations, however, it may be desirable to allow an application to be installed on the computing device. For instance, a driver of the automobile may be a salesperson, and the driver may wish to install an application thereon that facilitates tracking of sales information, receipts, etc.

SUMMARY

The following is a brief summary of subject matter that is described in greater detail herein. This summary is not intended to be limiting as to the scope of the claims.

Described herein are various technologies pertaining to seamlessly integrating graphical user interfaces from different applications, possibly executing on different logical computing partitions, into a graphical user interface that appears to an end user as being from a single computer executable application. In an example, a user of a computing device, such as a personal computer, a tablet computer, a mobile telephone, or a computing device installed in an automobile, may wish to be provided with information from various different applications on a display screen. These applications may be executing in a single logical partition of the computing device, in a single logical partition on a remote computer, in different logical partitions of the computing device, in different logical partitions on remotely located computing devices, etc. In an exemplary embodiment, the computing device may be a computing system in an automobile, and the user of the computing device may wish to view an application that provides the user with details pertaining to current conditions of the automobile (amount of fuel remaining in the gas tank, mileage, etc.) as well as an image from a web-based mapping application. Accordingly, in this example, the first of the two applications is executing in a first logical partition of the computing device in the automobile, and the second application (a browser) is executing in a second logical partition on the computing device.

Graphical user interfaces of the two applications can be received through utilization of a user interface remoting protocol that is currently utilized to receive a graphical user interface from an application executing on a remotely located computer. Other techniques, however, for acquiring graphical user interfaces of applications are contemplated. Responsive to receiving these graphical user interfaces, a configuration can be accessed that defines the portions of the graphical user interfaces that are desirably displayed to the user on the display screen as well as locations on the display screen that such portions are to be displayed. This allows for a portion of the web browser (e.g., content in the web browser) to be displayed to the user rather than the entirety of the browser. Based at least in part upon content of the configuration, portions of the two aforementioned applications can be displayed together with one another in a single graphical user interface as if the two graphical user interfaces of the two separate applications were a part of a single application.

In addition to displaying different graphical user interfaces as a seamlessly integrated graphical user interface to a user, the technologies described herein allow the user to selectively interact with one of the applications. Continuing with the example above, the user may wish to perform a zoom operation on the image presented to the user in the integrated graphical user interface. The selection of a portion of the graphical user interface that corresponds to the browser application can be detected. For instance, the user may select the portion of the browser in the integrated graphical user interface through utilization of a touch sensitive display screen. This user input can be directed to the appropriate application (the browser) executing on the appropriate partition, and the application can react responsive to the user input. Any alterations to the graphical user interface of this application are then presented to the user in the integrated graphical user interface.

Other aspects will be appreciated upon reading and understanding the attached Figs. and description.

DETAILED DESCRIPTION

Figure 1:
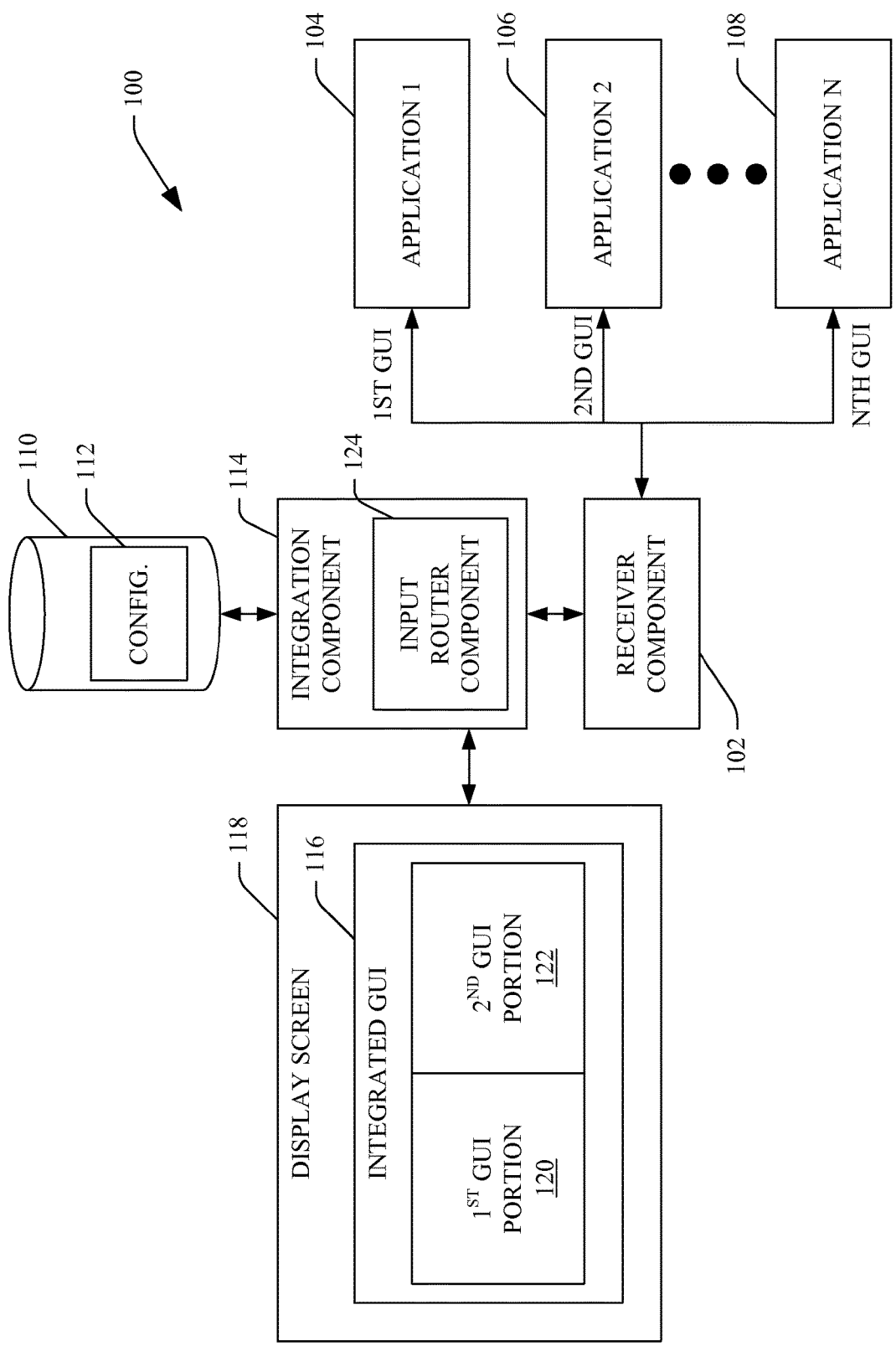
FIG. 1 is a functional block diagram of an exemplary system that facilitates generating an integrated graphical user interface that includes portions of a plurality of different graphical user interfaces for different applications.

Various technologies pertaining to integrating graphical user interfaces of different computer-executable applications, possibly executing on different logical partitions, will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference to FIG. 1, an exemplary system 100 that facilitates integrating portions of graphical user interfaces from a variety of different applications into an integrated graphical user interface such that, from a perspective of an end-user, the integrated graphical user interface appears to be from a single application, is illustrated. The system 100 may be included on a single computing device, such as a computing device in an automobile, or may be distributed across several different computing devices. The system 100 comprises a receiver component 102 that receives graphical user interfaces (GUIs) from a plurality of different computer executable applications. Specifically, the receiver component 102 can receive a first GUI from a first computer-executable application 104, a second GUI from a second computer-executable application 106, through an Nth GUI from an Nth computer-executable application 108. In an exemplary embodiment, the computer-executable applications 104-108 can be executing in a single partition on a single computing device. In another exemplary embodiment, the computer executable applications 104-108 can be executing on different logical partitions of a single computing device, wherein the different logical partitions have different operating systems. In still yet another exemplary embodiment, the computer-executable applications 104-108 can be executing in different logical partitions across different computing devices. Furthermore, the applications 104-108 may each be developed by different developers, wherein the applications 104-108 are not necessarily designed to communicate with one another.

The system 100 can further comprise a computer-readable data store 110 that includes a configuration 112. The configuration 112, in an exemplary embodiment, may be an XML file. The configuration 112 can specify display parameters (e.g., a layout) of a target integrated GUI. In other words, the configuration 112 can specify which computers and partitions to which to connect, which portions of GUIs of the partitions (of the applications 104-108) are to be included in an integrated GUI, shape of the portions of the GUIs of the applications 104-108 that are to be included in the integrated GUI, and where to include such portions of the GUIs in the integrated GUI. Additionally, the configuration 112 can define size, shape, location, or the like of portions of GUIs of the partitions to include in an integrated GUI at the pixel level.

The system 100 also comprises an integration component 114 that is in communication with the receiver component 102. The integration component 114 can automatically cause portions of a subset of the GUIs of the applications 104-108 to be simultaneously displayed together in an integrated graphical user interface (GUI) 116 on a display screen 118 that is viewable by a user. With more particularity, the integration component 114 can receive the subset of the GUIs of two or more of the applications 104-108, and may access the configuration 112 to determine which portions of the received GUIs are desirably included in the integrated GUI 116 for display on the display screen 118 to the user, as well as desired shapes of the portions of the GUIs to be displayed in the integrated GUI 116 and location of the portions of the GUIs to be displayed in the integrated GUI 116.

In the example shown in FIG. 1, the integrated GUI 116 includes a first GUI portion 120 that includes a portion of a first GUI of the first application 104, and a second GUI portion 122 that includes a portion of a second GUI of the second application 106, wherein the first and second GUI portions 120 and 122 are seamlessly integrated in the integrated GUI 116 such that from a perspective of an end user, the first GUI portion 120 and the second GUI portion 122 appear to belong to a single application. Additionally, the end user can interact with the first and second GUI portions 120 and 122, respectively, and the first and/or second GUI portions 120 and 122 can be updated based at least in part upon such user interaction.

The integration component 114 may optionally include an input router component 124 that receives input intended for one of the applications 104-108 and selectively routes the input to the appropriate application. For instance, through an input mechanism such as a touch sensitive display, a keypad, a mouse, a joystick or the like, the user may provide input to one or more of the computer executable applications 104-108. The input router component 124 can direct the input to the appropriate application (based upon location on the display screen 118 where a mouse or finger is used to select an application, based upon a type of device utilized to interact with the application, etc.). The application receives the input by way of the input router component 124, and the application may update the GUI for such application based at least in part upon the input received from the input router component 124. The receiver component 102 can receive updates to the portion of the GUI that is displayed in the integrated GUI 116 responsive to the appropriate application operating on the received input. In other words, the end user can selectively interact with the subset of the computer executable applications 104-108 that have their corresponding GUIs at least partially included in the integrated GUI 116.

In an exemplary embodiment, at least a portion of the system 100 may be included in a computing system that is configured to provide information to a driver of an automobile. Accordingly, the display screen 118 may be included in a console or on a dash of the automobile and at least one of the computer executable applications 104-108 may be configured to display information pertaining to at least one condition of the automobile to the user. This information may include, but is not limited to, current velocity of the automobile, acceleration of the automobile, current amount of fuel in a fuel tank of the automobile, electrical charge of the battery of the automobile, etc. Thus, for instance, the first computer executable application 104 may execute in a first logical partition of a computing system that is included in the automobile. In an example, the end user may be a salesperson and the second GUI portion 122 may correspond to the second application 106, wherein such application 106 is configured to assist the user in connection with monitoring prices, inventory, etc. of a particular item or service that is sold by the salesperson. Accordingly, the second application 106 may be executing in a different logical partition than the logical partition in which the first application 104 is executing. In a particular example, the second computer executable application 106 may be executing remotely as a part of a cloud computing service. The receiver component 102 receives the GUIs of both of the first application 104 and the second application 106 from the respective logical partitions, and the integration component 114 accesses the configuration 112, which defines which portions of such GUIs are to be included at which locations on the display screen 118 in the integrated GUI 116. Therefore, rather than the end user having to resize windows corresponding to the applications and selectively reactivate different windows to interact with the applications, the integrated GUI 116 appears to the end user as if it belonged to a single application, and the user can interact with the integrated GUI 116 in a manner that is natural to the end user.

While the example set forth above has corresponded to a computer system embedded in an automobile, it is to be understood that the system 100 can be implemented in any suitable computing device, including but not limited to, a portable telephone, a personal computer, a laptop computer, a tablet computing device, a portable media player, or other suitable computing device. Still further, while the integration component 114 has been described as integrating portions of GUIs of different applications based at least in part upon the contents of the configuration 112, it is to be understood that the integration component 114 can be programmed to selectively determine a manner in which to display portion of GUIs of different applications in the integrated GUI 116 at runtime. For instance, depending upon a state of a computer-executable application (e.g., which program runs in a remote partition), the shape and properties of the integrated GUI 116 or the portion of the GUI of an application to be displayed in the integrated GUI 116 can change at runtime. For example, one of the computer executable applications with a portion of its GUI included in the integrated GUI 116 may be a navigation application that executes in a partition dedicated to the manufacturer of the automobile. Such partition may also be configured to display the overall layout of the application. If, however, an untrusted application is executed in a partition of the computing system dedicated to the user (such as a calendar application), such partition is to be made visible and shown at the position in the integrated GUI 116 where it fits into the overall layout of the integrated GUI 116. Therefore, in summary, the system 100 facilitates selectively acquiring portions of GUIs from computer-executable applications that may be running in different logical partitions on different computing devices with different operating systems, etc., and integrating these portions of the different GUIs into the integrated GUI.

The integration component 114, in an exemplary embodiment, will now be described. It is to be understood, however, that the integration component 114 can be implemented in a variety of different manners, and the embodiment described herein is presented for purposes of explanation. In an example, the integration component 114 can include an application-specific plug-in that implements application specific input conversions (e.g. custom joy stick) that can be understood by a corresponding application. Additionally, the application-specific plug-in can handle input routing to the appropriate application. Further, depending on the state of the application (e.g. focus) or special input events, the application-specific plug-in can override normal rules and cause an application to switch to a specific application state. For instance, pressing a "menu" button on a joy-stick may cause an application to be directed to a root menu.

The integration component 114 can execute as an independent process where the topology is not restricted. Thus, the integration component 114 can run as a local process, in a virtual partition, on a dedicated server, or as a cloud service. In an exemplary embodiment, the integration component 114 can use an existing control that allows for connection to acquire user interfaces from remote partitions, regardless of operating system executing on such partitions. Moreover, the integration component 114 can integrate high definition video and/or 3D visualization output by one of the applications 104-108 and include such high definition video and/or 3D visualization in the integrated GUI 116.

Figure 2:
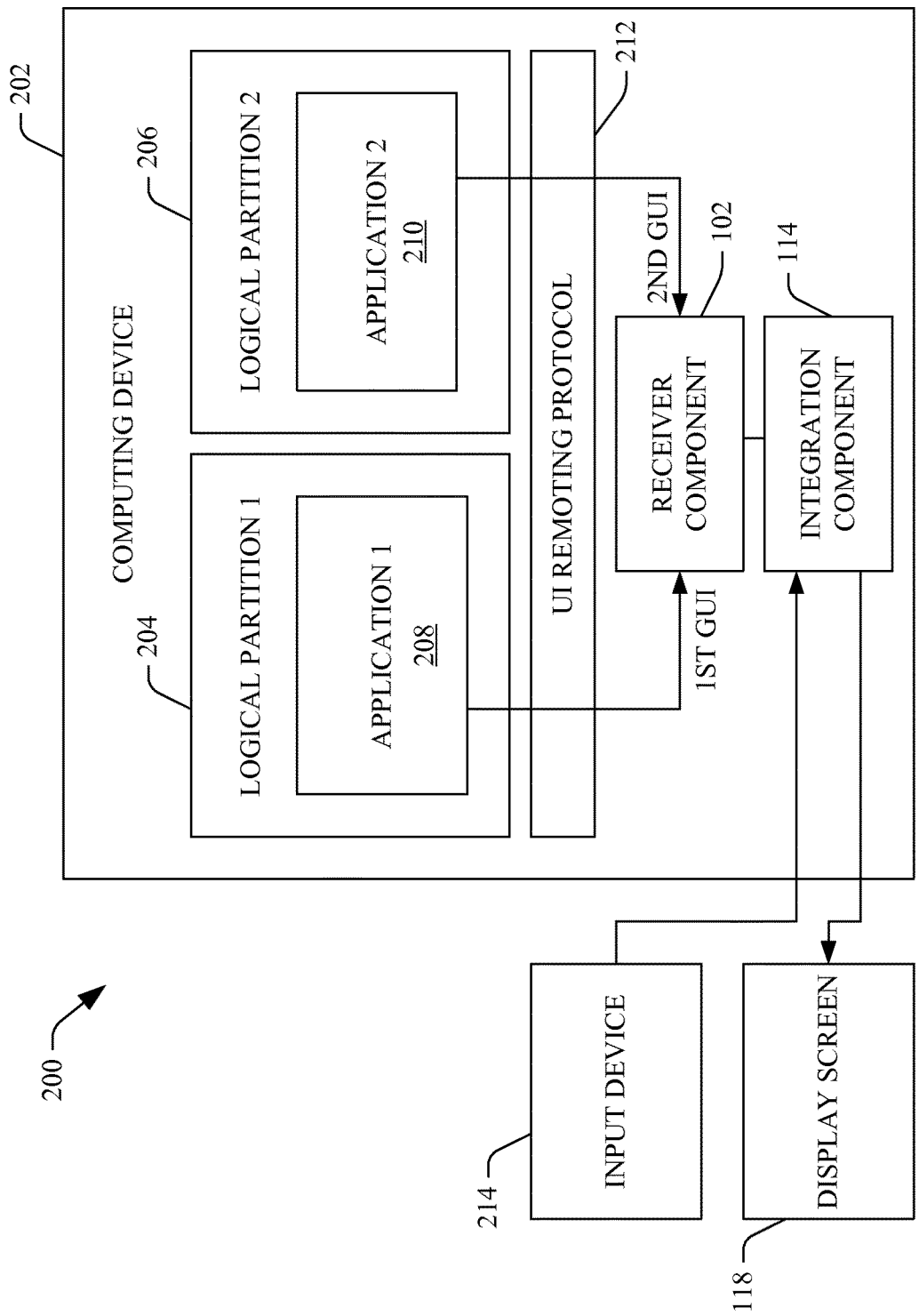
FIG. 2 is a functional block diagram of an exemplary system that facilitates integrating portions of graphical user interfaces of different applications executing in different logical partitions.

With reference now to FIG. 2, an exemplary system 200 that facilitates generating an integrated GUI is illustrated. The system 200 comprises a computing device 202, which may be any suitable computing device as described above. In an exemplary embodiment, the computing device 202 can be a computing system utilized in an automobile. In the exemplary embodiment depicted in FIG. 2, the computing device 202 includes a first logical partition 204 and a second logical partition 206. The computing device 202 may also include several other logical partitions. As will be understood by one skilled in the art, a logical partition is a subset of computing resources of the computing device 202 that are virtualized as separate computers. Accordingly, the computing device 202 can be partitioned into multiple logical partitions, wherein each of the first logical partition 204 and the second logical partition 206 can host separate operating systems. Therefore, the first logical partition 204 may include a first subset of hardware resources of the computing device 202 configured to execute a first operating system while the second logical partition 206 may include a second subset of hardware resources of the computing device 202 configured to execute a second operating system.

The first logical partition 204 may include a first computer executable application 208 executing thereon, and the second logical partition 206 may include a second computer executable application 210 executing thereon. In this example, it may be desirable to display a portion of the graphical user interface of the first application 208 together with a portion of the graphical user interface of the second application 210 together as a portion of an integrated graphical user interface on the display screen 118.

The receiver component 102 can receive a first graphical user interface of the first application 208 and a second graphical user interface of the second application 210 by way of a user interface remoting protocol 212. The user interface remoting protocol 212 may be a protocol that is conventionally employed to display a user interface of a remote computing device (partition) on a display screen of a computing device. This facilitates separation of the first application 208 and the second application 210, as the application functionality is not called in a single partition. The integration component 114 can receive the first and second GUIs and can select portions (and shapes of the portions) of such GUIs for display on the integrated GUI 116 (not shown) at particular locations in the integrated GUI 116.

The system 200 may further comprise an input device 214 that facilitates provision of user input to one of the applications 208 or 210. The input device 214 may be or include a sensor in the display screen 118 that facilitates touch-sensitive interaction, a mouse, a microphone that facilitates receipt of voice commands, a joystick, a keypad, or the like. The user can interact with the computer executable applications 208 and/or 210 by selectively interacting with the appropriate portions of the GUIs corresponding to such applications 208 and/or 210. For instance, one of the portions of the GUIs displayed in the integrated GUI 116 may include a hyperlink that can be selected through utilization of a mouse pointer. The user can employ the mouse pointer to select the hyperlink, and the input router component 124 (FIG. 1) can direct the selection of the hyperlink to the appropriate one of the first application 208 or the second application 210. This application may then perform some action (browsing to a webpage corresponding to the hyperlink) such that the GUI of the application is updated. The receiver component 102 receives the updated GUI by way of the UI remoting protocol 212, and the integration component 114 integrates the updated GUI in real time on the integrated GUI 116 shown to the user on the display screen 118.

In another exemplary embodiment, the user may indicate that she desires to interact with an application other than one that is currently displayed in the integrated GUI 116. The user can employ an input mechanism, such as a touch-sensitive display, mouse pointer, voice command, etc. to indicate that she wishes to interact with such application. The integration component 114 can then update the integrated GUI 116 such that the user can interact with the application. In still yet another exemplary embodiment, the integrated GUI 116 may include a tab, hyperlink, or other suitable selectable entity, wherein such selectable entity is not application-specific. For instance, the selectable entity may point to a different configuration, which can alter behavior of the system 200 and/or the layout of the integrated GUI 116.

In the exemplary system 200 the receiver component 102 and the integration component 114 are shown as residing separate from the first logical partition 204 and the second logical partition 206. It is to be understood, however, that the receiver component 102 and the integration component 114 can reside in one of the logical partitions 204 or 206 that is a trusted logical partition. As mentioned above, the computing device 202 may be a computing device utilized in an automobile, and the first logical partition 204 may be a closed partition that is configured to execute applications that are providing information pertaining to at least one operating condition of the automobile to the user by way of the display screen 118. Accordingly, this first logical partition 204 may be closed in that the user may not modify applications executing thereon or install additional applications on such first logical partition 204. Thus, the receiver component 102 and the integration component 114 may be included in such first logical partition 204. In this manner, the first logical partition 204 may be responsible for overall look and feel of the integrated GUI 116, while the integration component 114 is responsible for selectively positioning and configuring portions of the GUIs of the first and second computer executable applications 208 and 210, respectively, in the integrated GUI 116.

Figure 3:
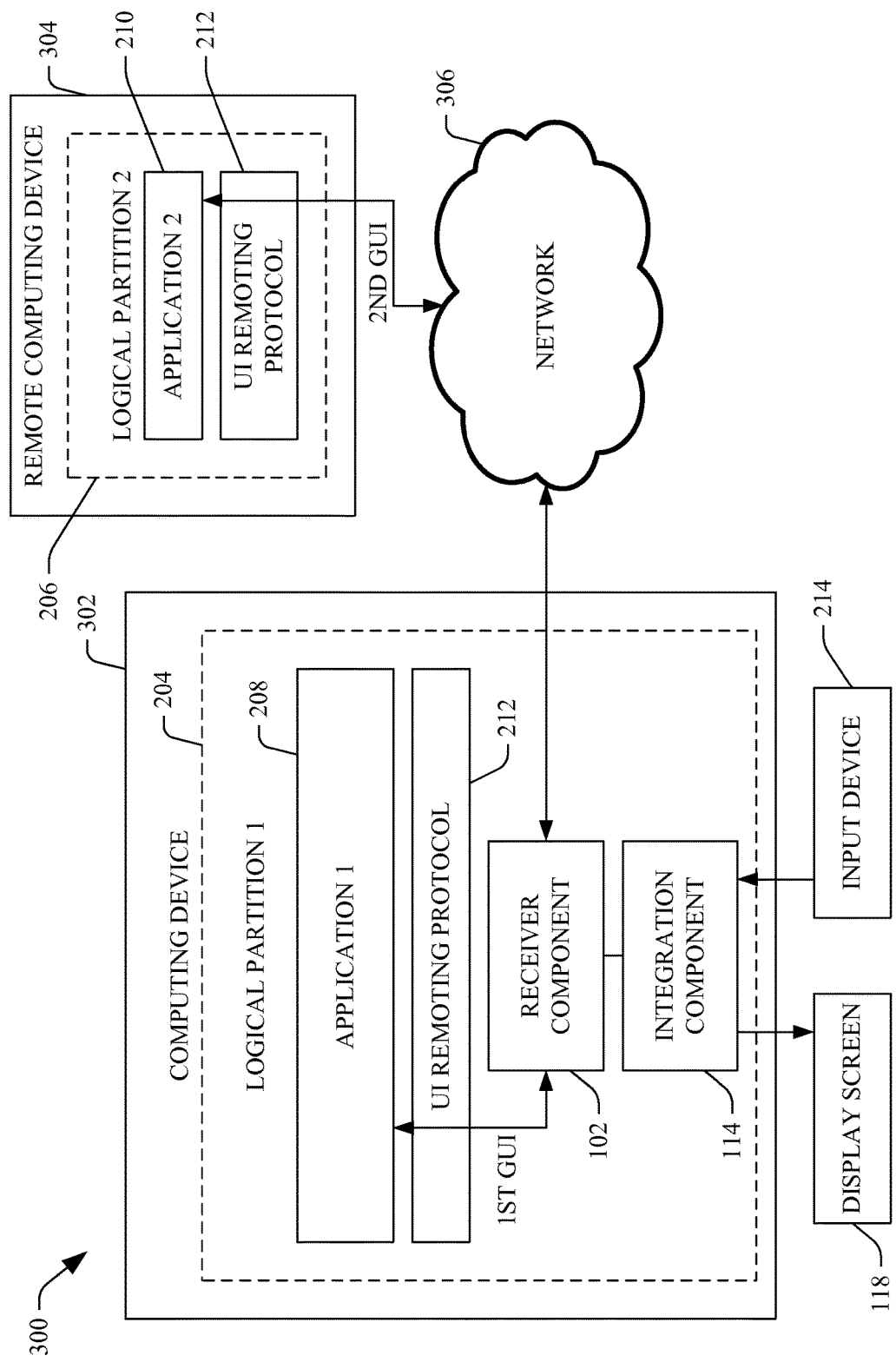
FIG. 3 is a functional block diagram of an exemplary system that facilitates integrating graphical user interfaces of two different applications that are executing on two different computing devices.

Now referring to FIG. 3, another exemplary system 300 that facilitates provision of an integrated GUI to a user is illustrated. The system 300 includes a first computing device 302 that is in communication with a second computing device (remote computing device) 304 by way of a network 306. The network 306 may be a local area network, wide area network, a cellular network, the Internet, or the like. The first computing device 302 includes the first logical partition 204 with the first application 208 executing thereon. The first computing device 302 additionally includes the receiver component 102 that can receive the first GUI of the first application 208 by way of the UI remoting protocol 212. While FIG. 3 depicts the receiver component 102 receiving the first GUI of the first application 208 by way of the UI remoting protocol 212, it is to be understood that the receiver component 102 can receive the first GUI directly from the first application 208. For purposes of programming consistency, however, it may be desirable to cause the receiver component 102 to receive the first GUI by way of the UI remoting protocol 212.

The remote computing device 304 includes the second logical partition 206 that comprises the second application 210 executing thereon. The receiver component 102 can receive the second GUI from the second application 210 by way of the network 306 and the UI remoting protocol 212. As described above, the integration component 114 can receive the GUIs of the first and second partitions 204 and 206, and thus receive the GUIs of first and second applications 208 and 210, and can selectively cause particular portions of these GUIs to be displayed in the integrated GUI on the display screen 118.

The system 300 additionally includes the input device 214, which can be used by the user to interact with either the first application 208 or the second application 210. For example, the user can interact with the second application 210 by way of the integration component 114 and/or the receiver component 102 transmitting user interactions from input device 214 to the second application 210 by way of the network 306 and the UI remoting protocol 212. Updates to the second GUI of the second application 210 may then be transmitted by way of the network 306 to the receiver component 102, and the integration component 114 can integrate the updated GUI into the integrated GUI 116 on the display screen 118.

Figure 4:
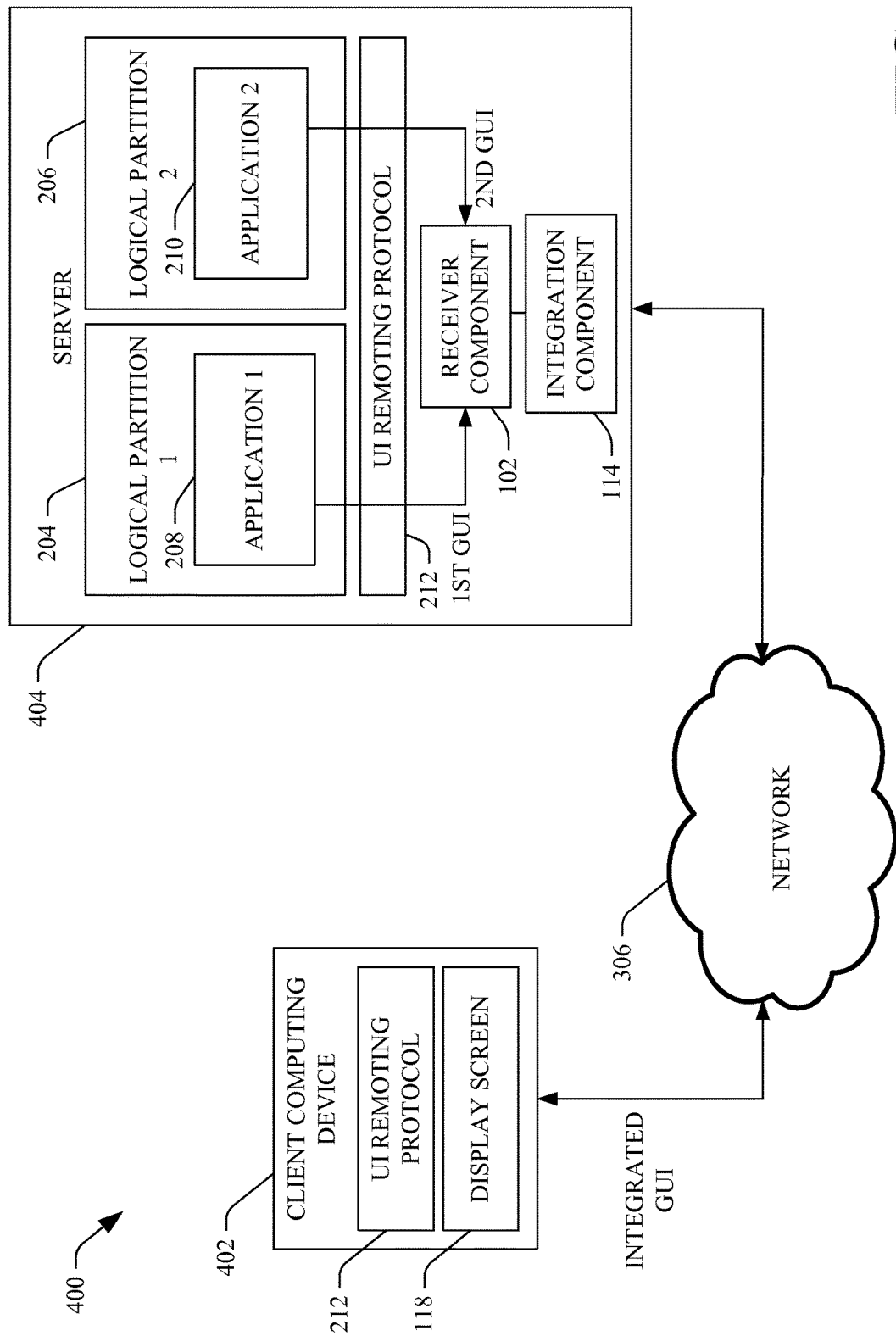
FIG. 4 is a functional block diagram of an exemplary system that facilitates integrating portions of varying graphical user interfaces of different applications that are both executing on a remote computing device.

Now referring to FIG. 4, another exemplary system 400 that facilitates generation of an integrated GUI on a display screen is illustrated. The system 400 includes a client computing device 402 that has the display screen 118 thereon. The client computing device 402 is in communication with a server 404 by way of the network 306. Here, the client computing device 402 is a thin client that does not execute either of the applications 208 or 210, but instead acts as a gateway to applications executing on the server 404. Accordingly, the server 404 includes the first logical partition 204 and the second logical partition 206, wherein the first logical partition 204 includes the first application 208 executing thereon and the second logical partition 206 includes the second application 210 executing thereon. The server 404 additionally includes the receiver component 102 that receives the first and second GUIs of the first and second applications 208 and 210, respectively. The server 404 also comprises the integration component 114 that acts as described above to generate the integrated GUI 116. The integrated GUI 116 may then be transmitted from the server 404 to the client computing device 402 by way of the network 306, wherein the integrated GUI 116 (not shown) can be displayed on the display screen 118. The user of the client computing device 402 may interact with the first application 208 or the second application 210 by way of the integrated GUI as described above.

Figure 5:
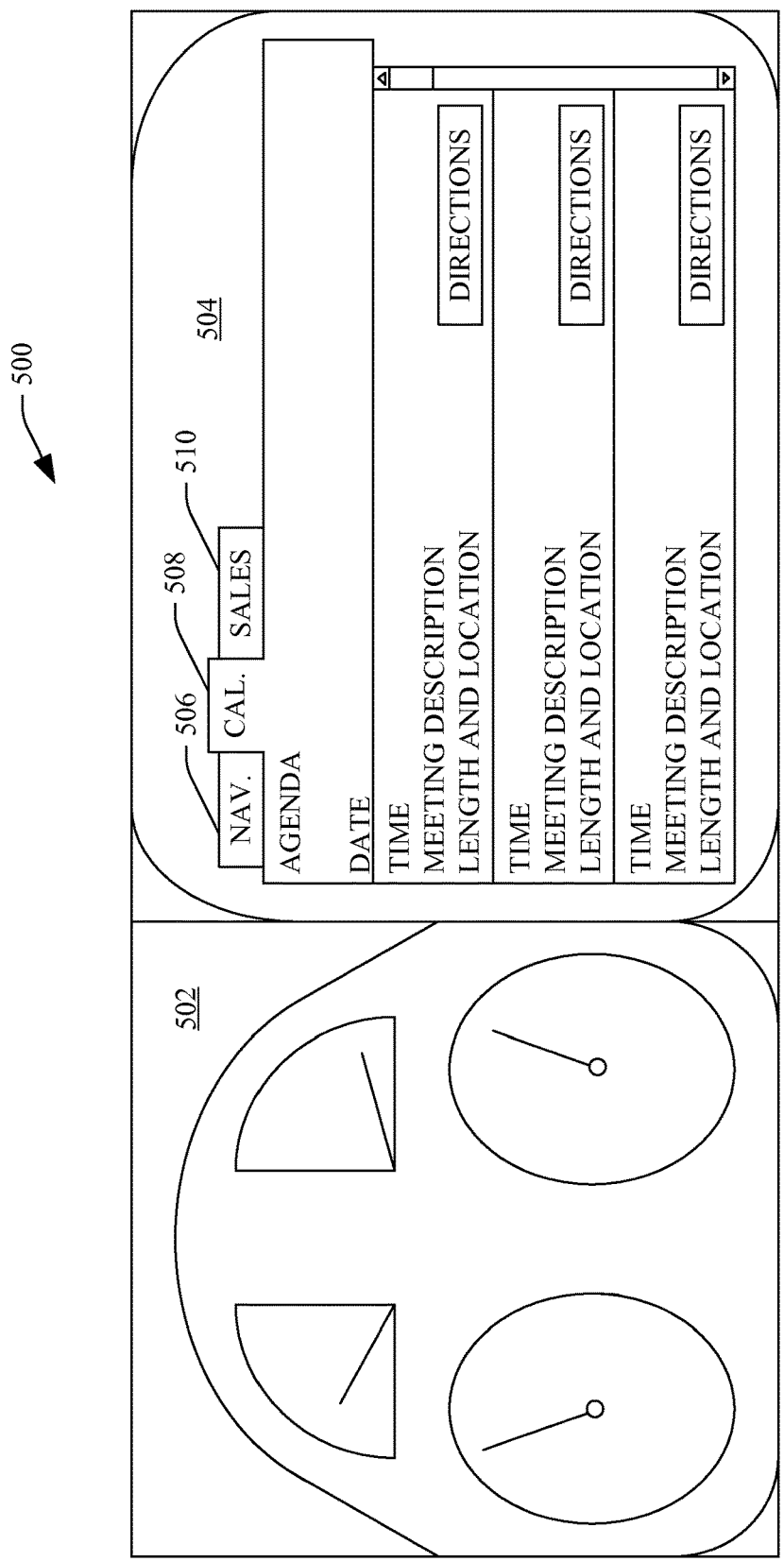
FIG. 5 is an exemplary integrated graphical user interface.

Referring now to FIG. 5, an exemplary integrated GUI 500 is illustrated. The integrated GUI 500 includes a first portion 502 that is configured to display graphical user interfaces from applications executing in a trusted partition. The GUI 500 also includes a second portion 504 that is configured to display graphical user interfaces from applications executing in untrusted partitions. For instance, the first portion 502 can depict a portion of a graphical user interface of an application executing in a trusted partition of a computing system of an automobile. Accordingly, the first application can be configured to present information to the user such as velocity, acceleration, gas, etc.

The second portion 504 of the integrated GUI 500 may include a plurality of selectable entities 506-510, where in FIG. 5 these selectable entities are shown as tabs. The tabs themselves may be graphical entities that correspond to the trusted partition, and may link to a certain configuration. For instance, user selection of the tab 506 may cause a navigation application to be displayed in the second portion 504, user selection of the tab 508 may cause a calendar application to be displayed in the second portion 504, and user selection of the tab 510 may cause a sales-related application to be displayed in the second portion 504. Thus, the selectable entities 506-510 link to configurations that can cause the layout of the integrated GUI 500 to be updated at runtime. In the example shown in FIG. 5, the user has selected the calendar application and accordingly, the integration component 116 can dynamically configure the integrated GUI 500 to display a calendar of the user (e.g., retrieved from an e-mail application). If the user chooses to utilize a different application, the user can select, for instance, a tab 506 corresponding to the sales application, and a new composition is shown to the user at runtime. Therefore, contents from different tabs may be from different partitions.

Figure 6:
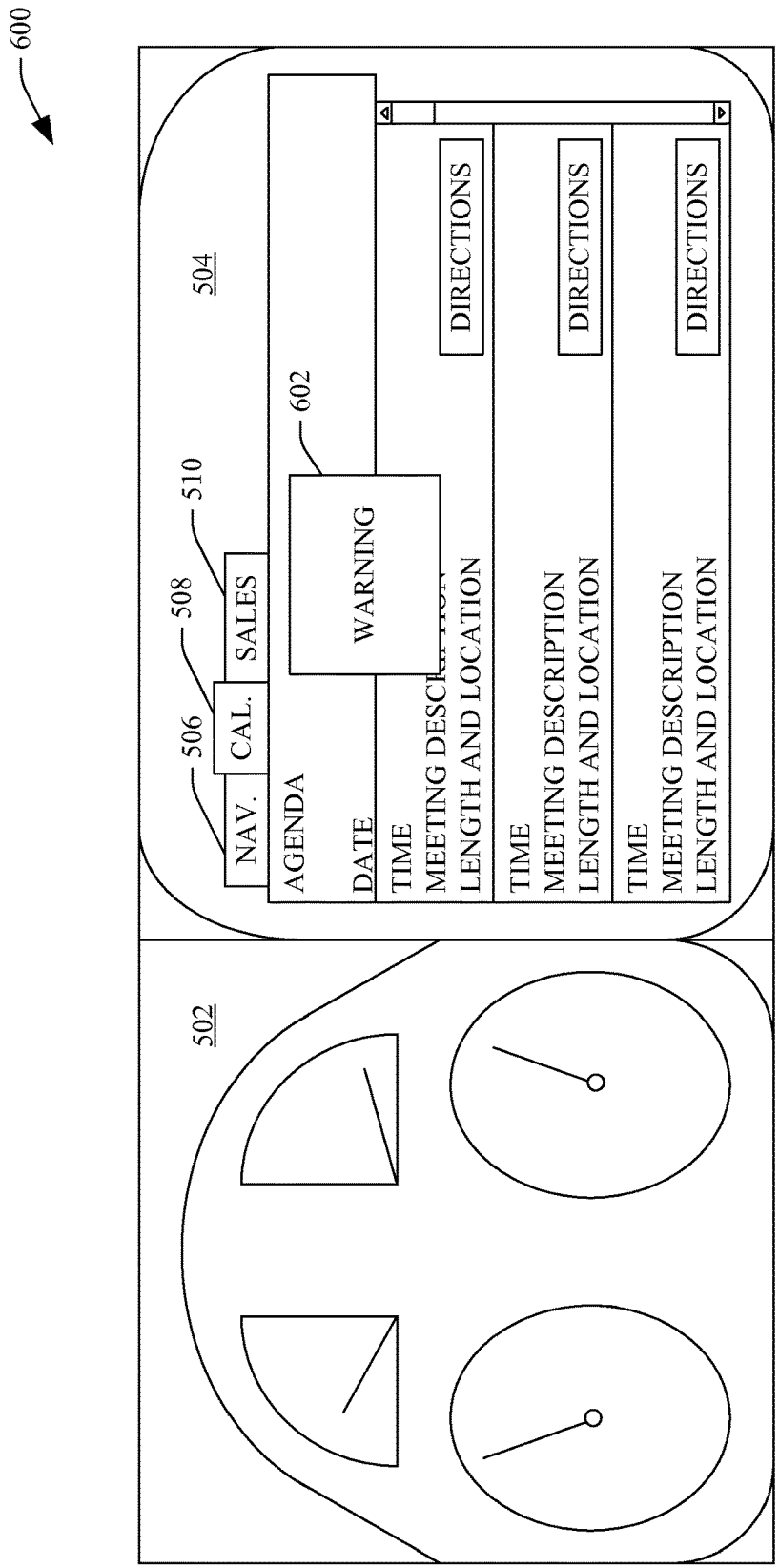
FIG. 6 is another exemplary integrated graphical user interface.

Now referring to FIG. 6, another exemplary integrated GUI 600 is shown. In this example, the integration component 114 can cause a GUI 602 that depicts a warning to be overlaid above the portion 504 corresponding to the untrusted partition. For instance, the first portion 502 of the integrated GUI 116 can display information pertaining to operation of the automobile and the second portion 504 can primarily display a user calendar. A sensor on the automobile may detect that tire pressure is low and may wish to cause a warning to be presented to the user. The integration component 114 can receive the GUI of the application that provides a warning and can selectively integrate such GUI 602 into the integrated GUI 600. In this example, the GUI 602 that includes the warning is overlaid on the portion of the GUI for the calendar application that is included in the integrated GUI 600. In an exemplary embodiment, the GUI 602 may correspond to an application executing in the trusted partition, but as shown may overlay the GUI of the calendar application that is executing in the untrusted partition. Alternatively, the warning may be displayed in the first portion and overlay an application that executes in the trusted partition.

Figure 7:
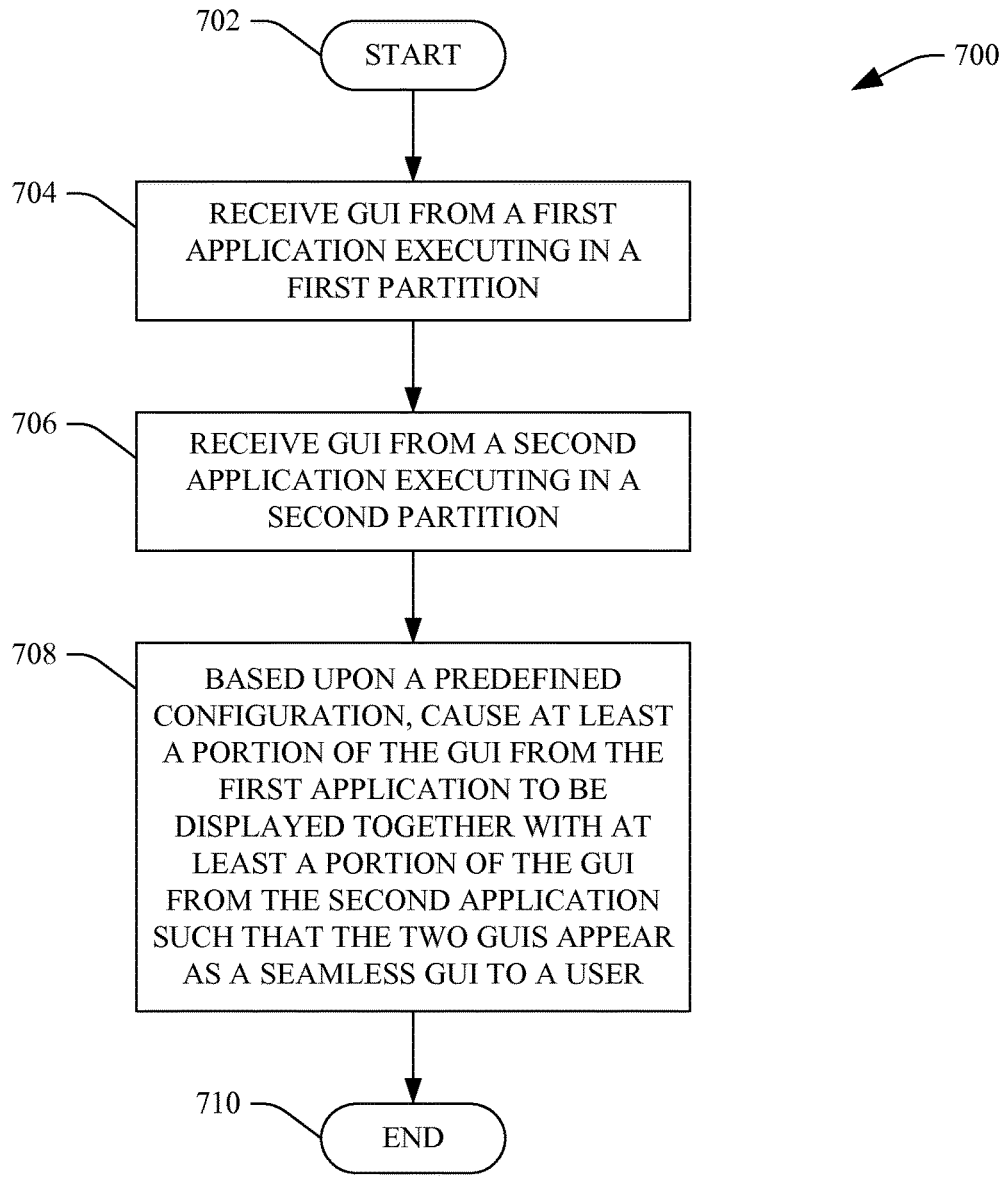
FIG. 7 is a flow diagram that illustrates an exemplary methodology for integrating portions of graphical user interfaces from different applications into an integrated graphical user interface.
Figure 8:
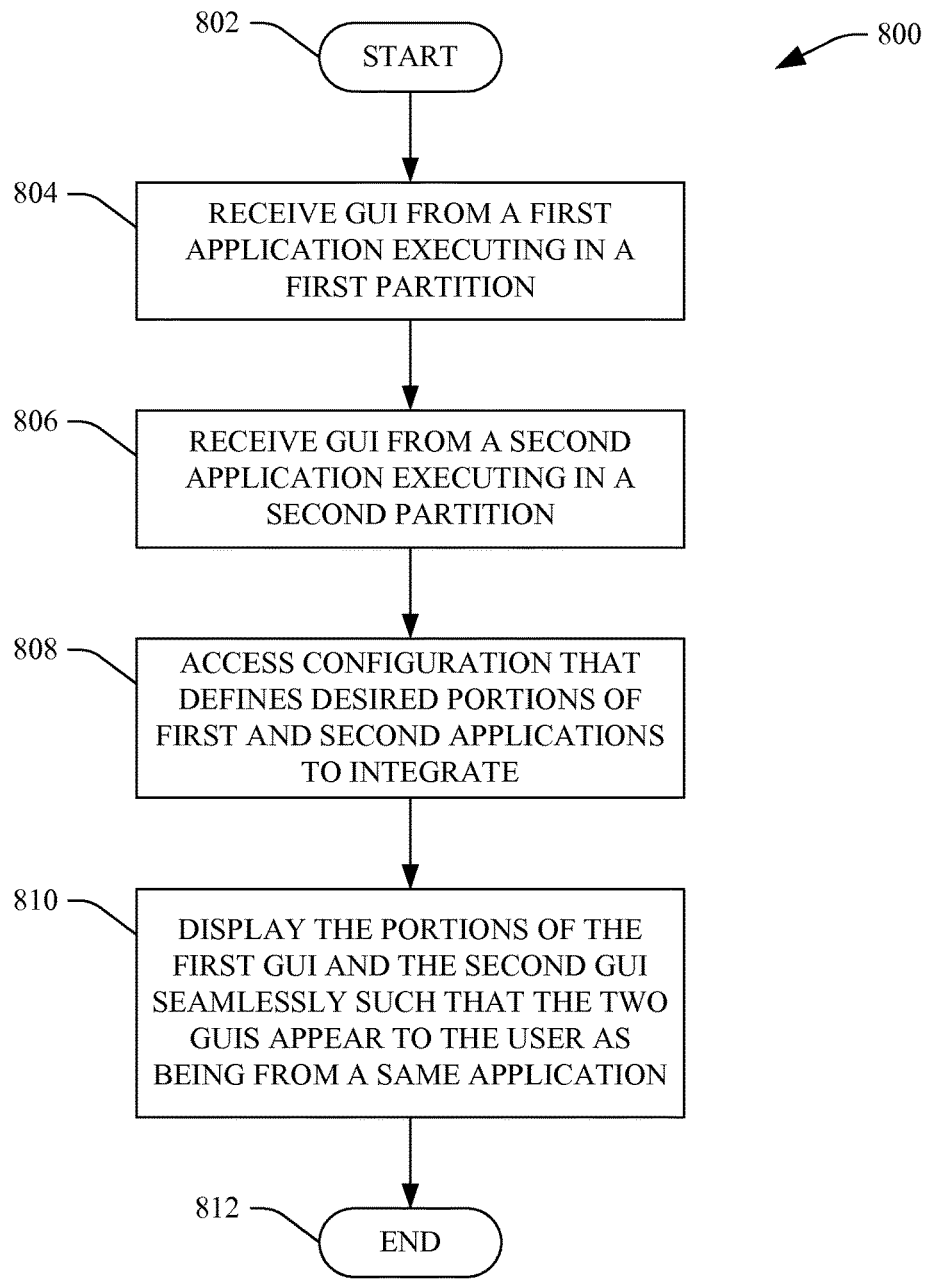
FIG. 8 is a flow diagram that illustrates an exemplary methodology for displaying portions of different graphical user interfaces seamlessly such that the different graphical user interfaces appear to a user as being a part of a single application.

With reference now to FIGS. 7-8, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

With reference now to FIG. 7, an exemplary methodology 700 that facilitates generating an integrated GUI is illustrated. The methodology 700 starts at 702, and at 704 a first graphical user interface of a first computer executable application is received from a first partition. At 706 a second graphical user interface of a second computer executable application is received from a second partition.

At 708, at least a portion of the GUI of the first application is displayed with at least a portion of the second GUI of the second application such that the two GUIs appears as seamless GUI to a user. This can be undertaken based at least in part upon a predefined configuration that is retained in a configuration as described above. The methodology 700 completes at 710.

With reference now to FIG. 8, an exemplary methodology 800 that facilitates generation of an integrated GUI is illustrated. The methodology 800 starts at 802, and at 804 a first graphical user interface of a first application executing in a first partition is received. At 806, a second graphical user interface of a second computer executable application executing in a second partition is received.

At 808, a configuration is accessed that defines desired portions of first and second graphical user interfaces to integrate into the integrated GUI. In other words, a first portion of the first graphical user interface that is to be displayed in the integrated graphical user interface is selected, and a second portion of the second graphical user interface that is to be displayed in the integrated graphical user interface is selected. Thereafter, a first position on a display screen to display the first portion of the first graphical user interface is selected and a second position on the display screen to display the second portion of the second graphical user interface is selected. These portions and positions can be selected based at least in part upon the configuration.

At 810, the portion of the first graphical user interface and the portion of the second graphical user interface are caused to be concurrently displayed on the display screen in the integrated graphical user interface at the first position and the second position, respectively, wherein the integrated graphical user interface appears to an end user as being a part of a single application. Thus, the respective portions of the two graphical user interfaces are seamlessly displayed such that they appear to be a portion of a single application. The methodology 800 completes at 812.

Figure 9:
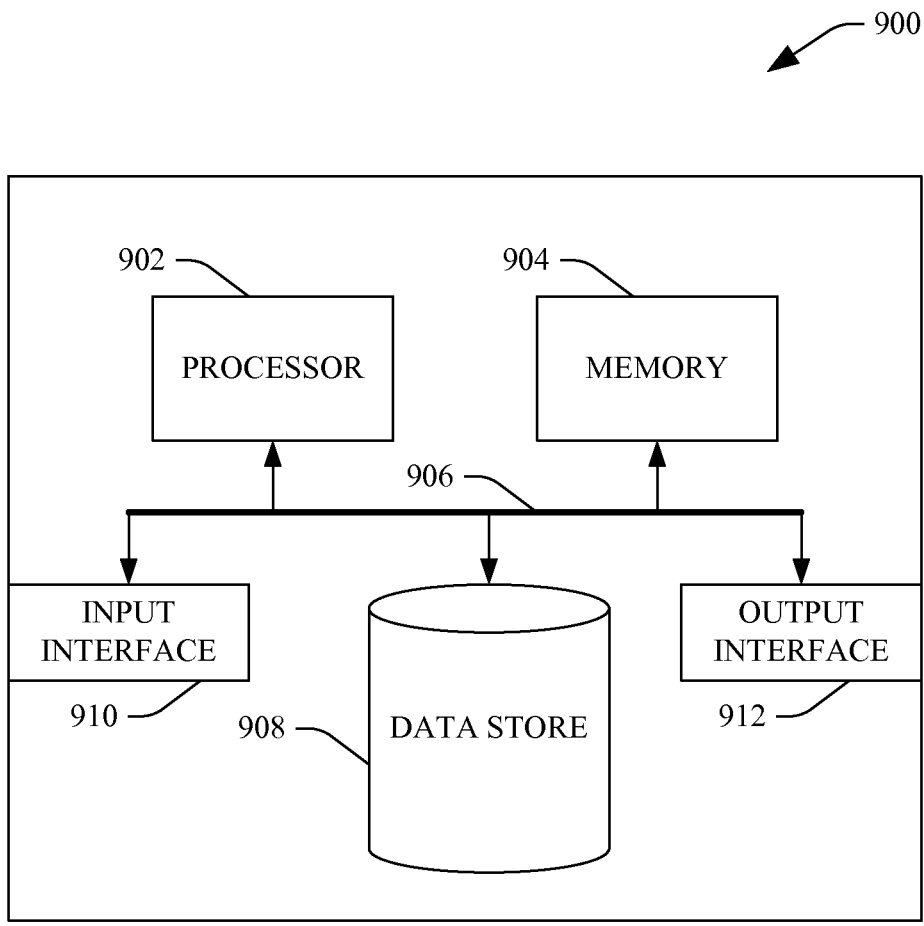
FIG. 9 is an exemplary computing system

Now referring to FIG. 9, a high-level illustration of an exemplary computing device 900 that can be used in accordance with the systems and methodologies disclosed herein is illustrated. For instance, the computing device 900 may be used in a system that supports generating an integrated GUI from applications executing in different logical partitions of a computing system. In another example, at least a portion of the computing device 900 may be used in a system that supports generating an integrated GUI based upon GUIs of applications executing on different computing devices. The computing device 900 includes at least one processor 902 that executes instructions that are stored in a memory 904. The memory 904 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store images, text, etc.

The computing device 900 additionally includes a data store 908 that is accessible by the processor 902 by way of the system bus 906. The data store 908 may be or include any suitable computer-readable storage, including a hard disk, memory, etc. The data store 908 may include executable instructions, images, videos, etc. The computing device 900 also includes an input interface 910 that allows external devices to communicate with the computing device 900. For instance, the input interface 910 may be used to receive instructions from an external computer device, GUIs from a remote computing device, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed by a computing system in an automobile, the method comprising:
   receiving a first graphical user interface of a first computer-executable application, the first graphical user interface comprises data that is indicative of an operating condition of the automobile;
   receiving a second graphical user interface of a second computer-executable application, wherein the second graphical user interface is received by way of a user interface remoting protocol and from a mobile computing device that is external to the computing system;
   accessing a data store that comprises a configuration, the configuration defining display parameters when a first portion of the first graphical user interface and a second portion of the second graphical user interface are displayed together in an integrated graphical user interface on a display screen in the automobile, the display parameters identifying the first portion of the first graphical user interface, the second portion of the second graphical user interface to include in the integrated graphical user interface, the display parameters further identifying a position of the first portion relative to the second portion in the integrated graphical user interface; and
   displaying the first portion of the first graphical user interface and the second portion of the second graphical user interface in the integrated graphical user interface on the display screen based upon contents of the configuration, the integrated graphical user interface configured to appear to an end user as belonging to a single computer-executable application.

2. The method of claim 1, wherein the first computer-executable application executes in a logical computing partition of the computing system, and the second computer-executable application executes on the mobile device, and further wherein the first graphical user interface is received from the computing partition.

3. The method of claim 2, wherein the logical computing partition executes a first operating system and the mobile computing device executes a second operating system.

4. The method of claim 1, further comprising:
   detecting that user input has been received for one of the first computer-executable application or the second computer-executable application in the integrated graphical user interface; and
   selectively transmitting the user input to the one of the first computer-executable application or the second computer-executable application responsive to detecting that the user input has been received.

5. The method of claim 1, further comprising:
   receiving a third graphical user interface from a third computer-executable application; and
   causing a portion of the third graphical user interface to be overlaid on the first portion of the first graphical user interface that is displayed in the integrated graphical user interface based at least in part upon contents of the configuration.

6. The method of claim 1, wherein locations, shapes, and sizes of the first portion of the first graphical user interface and the second portion of the second graphical user interface that are included in the integrated graphical user interface are one of defined at the pixel level in the configuration or dynamically modified at runtime.

7. The method of claim 1, wherein the first computer-executable application and the second computer-executable application are developed by first and second developers, respectively, and wherein the configuration is developed by a third developer.

8. The method of claim 1, the second computer-executable application being a navigation application.

9. The method of claim 1, the first graphical user interface generated by the first computer-executable application, the second graphical user interface generated by the second computer-executable application.

10. An automobile comprising: a display screen;
    at least one processor; and
    memory that comprises instructions that, when executed by the at least one processor, cause the at least one processor to perform acts comprising:
    receiving a first graphical user interface of a first computer-executable application, the first graphical user interface generated by the first computer-executable application, the first computer-executable application configured to cause data that is indicative of an operating condition of the automobile to be presented in the first graphical user interface;
    receiving, by way of a user interface remoting protocol and from a mobile computing device, a second graphical user interface of a second computer-executable application that is executing on the mobile computing device, the second graphical user interface generated by the second computer-executable application, the second computer-executable application configured to cause second data to be presented in the second graphical user interface; and a display parameters identifying the first portion of the first graphical user interface, the second portion of the second graphical user interface to include in the integrated graphical user interface, the display parameters further identifying a position of the first portion relative to the second portion in the integrated graphical user interface;

causing at least a portion of the first graphical user interface and at least a portion of the second graphical user interface to be simultaneously displayed on the display screen in an integrated graphical user interface, the integrated graphical user interface configured to cause the data and the second data to appear as though the data and the second data were generated by a same computer-executable application.

11. The system of claim 10, wherein the first computer-executable application is executing at a computing system of the automobile and the second computer-executable application is executing at the mobile computing device.

12. The system of claim 11, wherein the computing system of the automobile executes a first operating system and the mobile computing device executes a second operating system.

13. The system of claim 10, the acts further comprising accessing a data store that comprises a configuration, the configuration defining the portion of the first graphical user interface and the portion of the second graphical user interface that are included in the integrated user interface.

14. The system of claim 13, wherein the configuration defines, by pixels, the portion of the first graphical user interface and the portion of the second graphical user interface that are to be displayed in the integrated graphical user interface.

15. The system of claim 10, the second computer-executable application being a navigation application.

16. The system of claim 10, the mobile computing device being a mobile telephone.

17. A computer-readable data storage medium in a computing system of an automobile, the computer-readable storage medium comprising instructions that, when executed by a processor of the computing system, cause the processor to perform acts comprising:

receiving a first graphical user interface of a first computer-executable application executing in a logical partition of the computing system, the first graphical user interface comprises data generated by the first computer-executable application, the data is indicative of an operating condition of the automobile;

receiving, from a mobile computing device and by way of a user interface remoting protocol, a second graphical user interface of a second computer-executable application executing on the mobile computing device, wherein the second graphical user interface comprises second data generated by the second computer-executable application;

based upon predefined display parameters:
  selecting a portion of the first graphical user interface that is to be displayed in an integrated graphical user interface on a display of the automobile;
  selecting a portion of the second graphical user interface that is to be displayed in the integrated graphical user interface on the display of the automobile;
  selecting a first position on the display to display the portion of the first graphical user interface;
  selecting a second position on the display to display the portion of the second graphical user interface; and
  causing the portion of the first graphical user interface and the portion of the second graphical user interface to be concurrently displayed on the display in the integrated graphical user interface at the first position and the second position, respectively, wherein the predefined display parameters identify the portion of the first graphical user interface, the first position on the display, the portion of the second graphical user interface, and the second position on the display.

18. The computer-readable data storage medium of claim 17, wherein the data is indicative of velocity of the vehicle.

19. The computer-readable data storage medium of claim 17, wherein the second computer-executable application is a navigation application.

20. The computer-readable data storage medium of claim 17, wherein the mobile computing device is a mobile phone.

* * * * *